United States Patent
Saini et al.

(10) Patent No.: US 11,521,221 B2
(45) Date of Patent: Dec. 6, 2022

(54) PREDICTIVE MODELING WITH ENTITY REPRESENTATIONS COMPUTED FROM NEURAL NETWORK MODELS SIMULTANEOUSLY TRAINED ON MULTIPLE TASKS

(71) Applicant: Adobe Inc., San Jose, CA (US)

(72) Inventors: Shiv Kumar Saini, Bangalore (IN); Vishwa Vinay, Bangalore (IN); Vaibhav Nagar, Gwalior (IN); Aishwarya Mittal, Mathura (IN)

(73) Assignee: ADOBE INC., San Jose, CA (US)

( * ) Notice: Subject to any disclaimer, the term of this patent is extended or adjusted under 35 U.S.C. 154(b) by 1199 days.

(21) Appl. No.: 15/909,723

(22) Filed: Mar. 1, 2018

(65) Prior Publication Data
US 2019/0272553 A1    Sep. 5, 2019

(51) Int. Cl.
*G06Q 30/02* (2012.01)
*G06N 3/04* (2006.01)
*G06N 7/00* (2006.01)
*G06F 16/9535* (2019.01)

(52) U.S. Cl.
CPC ..... *G06Q 30/0204* (2013.01); *G06F 16/9535* (2019.01); *G06N 3/0454* (2013.01); *G06N 7/005* (2013.01)

(58) Field of Classification Search
CPC ... G06Q 30/0204; G06N 3/0454; G06N 7/005
See application file for complete search history.

(56) References Cited

PUBLICATIONS

ADOBE "Adobe Audience Manager Features"http://www.adobe.com/data-analytics-cloud/audience-manager/capabilities.html, 2019, accessed Sep. 4, 2019, 6 pages.
ADOBE "Real Intelligence When You Need It" http://www.adobe.com/data-analytics-cloud.html?promoid=G4FRYXRR&mv=other, 2019, access Sep. 30, 2019 14 pages.
Weinman, Zhang, et al., "Deep Learning Over Multi-Field Categorical Data: A Case Study On User Response Prediction", arXiv:1601.02376v1 [cs.LG]11 Jan. 11, 2016, 12 pages.
(Continued)

*Primary Examiner* — Robert G Bachner
(74) *Attorney, Agent, or Firm* — Kilpatrick Townsend & Stockton LLP

(57) ABSTRACT

This disclosure involves predictive modeling with entity representations computed from neural network models simultaneously trained on multiple tasks. For example, a method includes a processing device performing operations including accessing input data for an entity and transforming the input data into a dense vector entity representation representing the entity. Transforming the input data includes applying, to the input data, a neural network including simultaneously trained propensity models. Each propensity model predicts a different task based on the input data. Transforming the input data also includes extracting the dense vector entity representation from a common layer of the neural network to which the propensity models are connected. The operations performed by the processing device include computing a predicted behavior by applying a predictive model to the dense vector entity representation and transmitting the predicted behavior to a computing device that customizes a presentation of electronic content at a remote user device.

20 Claims, 8 Drawing Sheets

(56) References Cited

PUBLICATIONS

Chamberlain, Benjamin Paul, et al., "Customer Life Time Value Prediction Using Embeddings", arXiv:1703.02596v3 [cs.LG] Jul. 6, 2017, 10 pages.

Maaten, Laurens Van Der, et al., "Visualizing High-Dimensional Data Using t-SNE", Journal of Machine Learning Research, Nov. 9, 2008, 27 pages.

PREDICTIVE MODELING WITH ENTITY REPRESENTATIONS COMPUTED FROM NEURAL NETWORK MODELS SIMULTANEOUSLY TRAINED ON MULTIPLE TASKS

TECHNICAL FIELD

This disclosure generally relates to artificial intelligence. More specifically, but not by way of limitation, this disclosure relates to applying predictive modeling to vector representations of entities, where these entity representations are computed from neural network models that are simultaneously trained to predict likelihoods of different event types involving the entities (i.e., tasks performed by individuals) with respect to the individuals.

BACKGROUND

Automated modeling systems are used for analyzing interactions with online services that provide digital forums in which end users may interact with online content (e.g., by purchasing products or services, commenting on products or services, etc.). Automated modeling systems use modeling algorithms that involve techniques such as logistic regression, neural networks, support vector machines, etc. These automated modeling algorithms are trained using training data, which can be generated by or otherwise indicate certain electronic interactions, transactions, or circumstances. This training data is analyzed by one or more computing devices of an automated modeling system. The training data is grouped into predictor variables that are provided as inputs to the automated modeling system. The automated modeling system uses this analysis to make predictions using data describing similar circumstances. For example, the automated modeling system uses the predictor variables to learn how to generate predictive outputs involving online transactions (or other circumstances) that are similar to the predictor variables from the training data.

Existing automated modeling systems use models that are built and taught in isolation from one another. Isolated models may be used to analyze and predict decisions made by users of online services. The isolated models are built independently using user profile data selected manually by a user based on perceived relevance to the predictions of the isolated models. These isolated models use past consumer behaviors to predict how consumers will behave with respect to future transactions. Past consumer behaviors are modeled using portions of clickstream data (e.g., data describing which interface features of an online service were "clicked" or otherwise accessed during a session) or other input data manually selected by an operator of the model and provided as inputs to the isolated models. For example, these isolated models are used for estimating a value of a consumer based on available and manually selected clickstream data for the consumer. Estimating the value of a consumer involves predicting the probability of a consumer action and assigning a value to the consumer based on revenue or another contribution generated by the manually selected clickstream data of the consumer.

Further, an attempt to compare users based on a propensity to perform an identified action also relies on a manual selection of one or more user attributes. For example, a system operator attempting to compare users manually identifies characteristics that the system operator deems relevant for identifying users that share similar propensities to perform the identified action. The system operator manually identifies the one or more user attributes or characteristics used to compare users based on observations performed by the system operator concerning the likelihood of a user to perform the identified action. Thus, the system operator compares users based on manually selected traits, and the comparison provides an incomplete or inaccurate indication of similarities between users.

Models that rely on manually selected clickstream data and that are built in isolation with respect to other models, however, may present disadvantages. For instance, solutions that rely on models built in isolation with respect to other models provide an incomplete or inaccurate picture of a consumer's intentions or dispositions. In one example, the isolated models fail to utilize predictions associated with other relevant models built to predict different results. In an additional example, the isolated models rely on different input data to generate outputs. This reliance on different input data results in inefficiencies with tracking data and generating accurate outputs. Thus, using different, isolated models could fail to accurately represent an entity in a manner that allows an automated modeling system to computationally simulate or otherwise predict human behavior. In another example, comparing the propensity of a group of users to perform an identified action based on a manually selected user attribute results in an incomplete or inaccurate comparison of the users. Thus, using the manually selected user attributes as a basis for the comparison could fail to accurately identify users that perform actions of interest in similar manners.

SUMMARY

Certain embodiments involve predictive modeling with entity representations computed from neural network models simultaneously trained on multiple tasks. For example, a method includes a processing device performing operations. The operations include accessing, from a non-transitory computer-readable medium, input data for an entity. Additionally, the operations include transforming the input data into a dense vector entity representation representing the entity. Transforming the input data includes applying, to the input data, a neural network including simultaneously trained subnets representing propensity models. Each propensity model, in operation, predicts a different task based on the input data. Transforming the input data also includes extracting the dense vector entity representation from a common layer of the neural network to which the simultaneously trained subnets are connected. Further, the operations performed by the processing device include computing a predicted behavior by applying a predictive model to the dense vector entity representation. The operations performed by the processing device also include transmitting the predicted behavior to a computing device that customizes, in accordance with the predicted behavior, a presentation of electronic content at a remote user device associated with the entity.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
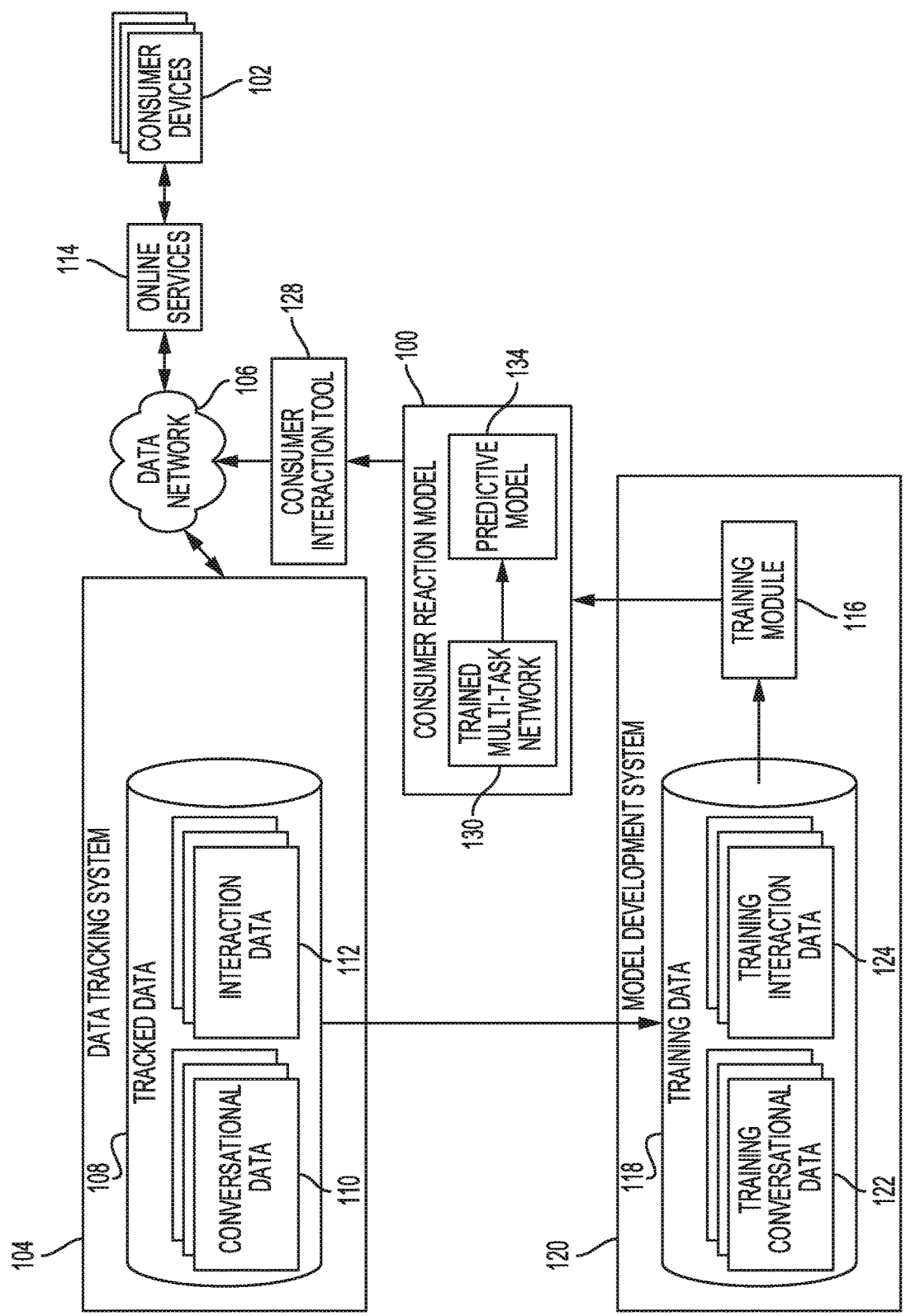
FIG. 1 depicts an example of a communications flow for generating and applying a consumer reaction model that uses dense vector entity representations generated by multi-task network models to predict decisions or other behavior by consumers or other end users, according to certain embodiments of the present disclosure.

The present disclosure includes systems and methods for predictive modeling with entity representations computed from neural network models simultaneously trained on multiple tasks. As explained above, conventional solutions for simulating the behavior of users with respect to online services are limited by their reliance on isolated models for different outputs, which may provide an incomplete picture of a users' behavior and thereby result in predictive isolated models with reduced accuracy. Certain embodiments described herein improve the performance of automated modeling systems by, for example, using joint training of models to identify and use common user characteristics across tasks. For example, joint training of models involves providing the same training data to more than one predictive model simultaneously to generate and train the predictive models (e.g., propensity models). In this manner, the multi-task networks produce reliable propensity modeling across various tasks and provide the dense vector entity representations to identify groups of consumers. Automated modeling systems that use these jointly trained models can accurately predict user actions and also represent consumers with dense vector entity representations at least because the jointly trained models rely on the same inputs from users to generate predictions and dense vector entity representations. Further, generating additional propensity models reduces further engineering of the propensity models by relying on common characteristics associated with the previously generated and trained propensity models.

The following non-limiting example is provided to introduce certain embodiments. In this example, a model development system having one or more processing devices executes a training module and communicates with a content-providing system that hosts consumer interaction tool. The model development system receives training data describing a user's interactions on a website or a software program. An example of this training data is a sparse vector representation of the entity, where different dimensions of the vector represent different characteristics of user interactions with an online service (e.g., browsing patterns, software type, user characteristics, etc.). The training module trains a multi-task network, such as a neural network having different subnets that implement different propensity models, where each propensity model is configured to predict a different task associated with an entity. These different subnets (and their associated propensity models) are simultaneously trained with common training data. Doing so improves the accuracy with which the multi-task network predicts certain user behaviors for a particular user state and improves the ability of the multi-task network to identify similar characteristics of consumers.

Continuing with this example, the model development system applies the trained multi-task network to input data (e.g., sparse vector representations of additional user interaction) and thereby generates a dense vector entity representation of an entity associated with the input data. The dense vector entity representation is a more concise representation of the entity, which is more suitable for modeling operations than a sparse vector representation. For instance, resource limitations (e.g., processor availability, memory capacity, etc.) may prevent the computing system from feasibly or efficiently applying automated modeling algorithms to sparse vector representations. The dense vector entity representation is generated at a common layer of the multi-task neural network, where the common layer connects various subnets corresponding to the propensity models. The model development system extracts the dense vector entity representation from the common layer.

In some embodiments, the dense vector entity representation concisely represents relevant characteristics of the entity and thereby allows the consumer interaction tool to more effectively customize a presentation of electronic content at a remote user device associated with the entity based on the dense vector entity representation. For instance, the training module could provide the consumer interaction tool with a consumer reaction model, which includes the trained multi-task network, that uses computer-implemented processes to electronically replicate certain behaviors, reactions, or decisions of individuals. The consumer interaction tool customizes a presentation of electronic content at a remote user device based on a predicted entity behavior generated by applying a lookalike-modeling portion of the consumer reaction model to a dense vector entity representation generated by the multi-task network. For instance, the dense vector entity representation of the entity is compared with other dense vector entity representations of other entities to identify groups of entities that are likely to interact with the website in a similar way. Because the lookalike modeling is "unsupervised" (i.e., there is typically no label that indicates that user X is similar to user Y), the dense vector entity representation provides a representation that notionally captures relevant characteristics of the users with respect to a user's propensity to perform task of interest. The consumer interaction tool is thus able to customize the presentation of electronic content to the entities based on the propensity of the users and the groups of users identified by the lookalike modeling to interact with the website in a specified manner.

As used herein, the term "propensity model" is used to refer to a model that predicts a consumer's interaction with a webpage or software program. Examples of the interaction include a conversion of a prospective consumer, a defection of an existing consumer, positive or negative feedback about electronic content available via an online service (e.g., content describing a brand on a social media website), etc. In some embodiments, the propensity models make up a portion of a neural network, and the propensity models are trained simultaneously with one another.

As used herein, the term "dense vector entity representation" is used to refer to a set of values used to represent an entity. In an example, the entity is a user of a website or software program whose activity is tracked with a data tracking system. The dense vector entity representation provides a representation of the user in a dense vector form, which is an efficient representation of the user for use in other models.

As used herein, the term "lookalike model" is used to refer to a model that compares a representation of an entity with representations of other entities. One example of the lookalike model involves receiving a dense vector entity representation of an entity and comparing the dense vector entity representation with other dense vector entity representations of other entities. The comparison of entities with the lookalike model enables segmentation and clustering of similar users and groups of users.

Certain embodiments described herein facilitate using automated modeling systems for predicting the behaviors of consumers or other end users. Examples of the automated modeling systems include multiple neural network models simultaneously trained on multiple predicted behaviors. Examples of predicted behaviors include a conversion of a prospective consumer, a defection of an existing consumer, positive or negative feedback about electronic content available via an online service (e.g., content describing a brand on a social media website), etc. In some embodiments, lookalike models use dense vector consumer representations generated at a common layer of the automated modeling systems to arrange or assess the value of certain consumers. The use of the lookalike models allows the behavior of consumers and other end users to be predicted.

FIG. 1 depicts an example of a communications flow for generating and applying a consumer reaction model that uses dense vector entity representations generated by multi-task network models to predict decisions or other behavior by consumers or other end users, according to certain embodiments. For instance, a consumer reaction model 100, which includes a trained multi-task network 130 and a predictive model 134, can be used for predicting the behavior of an end user, such as a consumer, based on various types of input data, such as interaction data 112, with respect to a program or webpage and conversational data 110 involving one or more users. In a non-limiting example, interaction data 112 includes mouse clicks, consumer profile data, location of access data, or any other tracked interaction data points ultimately accessible to the consumer reaction model 100. In a non-limiting example, conversational data 110 includes records such as email exchanges, transcripts of phone calls, or other unstructured data describing verbal or written discussions between two entities. Examples of these entities include sales personnel, prospective consumers, and existing consumers.

In the example depicted in FIG. 1, consumer devices 102 access one or more online services 114, where interactions with the online services 114 are tracked with a data tracking system 104 via a data network 106. Examples of the consumer devices 102 include, but are not limited to, personal computers, tablet computers, desktop computers, processing units, any combination of these devices, or any other suitable devices having one or more processors. Users of the consumer devices 102 use various products, applications, or services supported by the online services 114 via the data network 106. Examples of the data network 106 include, but are not limited to, internet, local area network ("LAN"), wireless area network, wired area network, wide area network, and the like. The data tracking system 104 is used to generate tracked data 108 from communications with the consumer devices 102. In some embodiments, the tracked data 108 includes interaction data 112 (e.g., clickstream data), conversational data 110 (e.g., email exchanges, instant-messaging conversations, transcripts of phone calls, etc.), or any combination thereof.

In this example, a training module 116 (or other suitable program code) is executed to obtain at least some training data 118, either directly or indirectly, from the data tracking system 104. The data tracking system 104 is used to generate the tracked data 108, which is stored in one or more computer-readable storage media that are included in or accessible to the data tracking system 104.

The data tracking system 104 generates the conversational data 110 and the interaction data 112 based at least partially on user inputs from the consumer devices 102. For example, the data tracking system 104 is used to track user interactions on one or more consumer devices 102 (e.g., tablet computers, smart phones, etc.). Examples of this communication include direct communication (e.g., emails, online chats, clickstream data, and other electronic communications with the data tracking system 104) and indirect communication provided to the data tracking system 104 (e.g., person-to-person sales calls that are recorded, transcribed, or otherwise documented, etc.). Clickstream data can include one or more data strings that describe or otherwise indicate data describing which interface features of an online service were "clicked" or otherwise accessed during a session. Examples of clickstream data include any consumer interactions on a website, consumer interactions within a local software program of a computing device, information from generating a user profile on a website or within a local software program, or any other consumer activity performed in a traceable manner.

A model development system 120 obtains training data 118 from the data tracking system 104 (as depicted in FIG. 1) or from a non-transitory computer-readable medium accessed by the data tracking system 104 for storing the tracked data 108. For example, the model development system 120 selects at least some of the tracked data 108 for use as the training data 118. In some embodiments, the model development system 120 includes computing hardware, such as a processing device that executes the training module 116 and a non-transitory computer-readable medium and associated data structures that store the training data 118. In one example, the model development system 120 communicates with the data tracking system 104 and thereby selects, as a set of training data 118, some or all of the conversational data 110 as training conversational data 122. The model development system 120 also selects some or all of the interaction data 112 as the training interaction data 124.

The model development system 120 executes the training module 116 to generate, train, optimize, or otherwise develop the consumer reaction model 100 based on the training data 118. The consumer reaction model 100 is used to predict decisions made by a consumer or other behavior of a consumer. For illustrative purposes, the consumer reaction model 100 is described herein using simplified examples involving consumers. But the operations described herein can be applied to any automated modeling system that can use tracked interaction data to build a predictive model.

The training module 116 outputs the consumer reaction model 100 for use by a consumer interaction tool 128. Examples of outputting the consumer reaction model 100 include transmitting the consumer reaction model 100 to a computing device that executes the consumer interaction tool 128, storing the consumer reaction model 100 in a non-transitory computer-readable medium accessible by the consumer interaction tool 128, etc.

In an example, the consumer reaction model 100 simulates the decision-making process of a consumer or other end user. Simulating the decision-making process of a consumer or other end user results in the consumer reaction model 100 determining a probability that the consumer or other end user will purchase a product or service (e.g., the probability of a conversation), a probability that the consumer or other end user will abandon a transaction, a probability that the consumer or other end user will terminate a particular service, or other probabilities involving actions of a consumer or other end user. In an example, the consumer interaction tool 128 is able to facilitate creation of digital experiences for consumers or other end users based on the results of the consumer reaction model 100. That is, the consumer interaction tool 128 guides digital information presented to a consumer on a display of a consumer device 102 to correspond to goals associated with the output of the consumer reaction model 100.

In some embodiments, the consumer reaction model 100 predicts the behavior of an end user. For example, the consumer reaction model 100 depicted in FIG. 1 includes a trained multi-task network 130 that generates predictive outputs associated with a set of propensity models and a dense vector entity representation. The consume reaction model 100 also includes a predictive model 134, which may include a lookalike model. The predictive model 134, in some embodiments, receives the dense vector entity representation from the trained multi-task network 130 to identify consumers with similar user characteristics and propensities.

In some embodiments, the data tracking system 104 provides the tracked data 108 of a set of consumers (e.g., a set of sales journey data for lead or existing consumers) to the model development system 120. Based on the tracked data 108, portions of which are supplied to the model development system 120 as the training data 118, the training module 116 is able to train the consumer reaction model 100 to provide reliable predictive output regarding the states or tasks of a consumer. The predictive output indicates a probability of a user or consumer performing some action of interest (e.g., purchasing a product, terminating a service, etc.) based on input variables (e.g., the tracked data 108) associated with the user or consumer.

For illustrative purposes, FIG. 1 depicts the consumer reaction model 100 having the trained multi-task network 130. The trained multi-task network 130 includes a plurality of propensity models that are trained simultaneously. Each of the propensity models of the trained multi-task network 130 are associated with likelihood predictions of tasks for consumers (or other end users) that are identified by the training module 116. Furthermore, any number of tasks and associated propensity models may be generated for the consumer reaction model 100 using the training module 116. The resulting propensity models of the multi-task network 130 are simultaneously trained by the training module 116 to identify and use common user characteristics across the tasks associated with the propensity models. As an example, when the trained multi-task network 130 is built including propensity models for consumer conversion, consumer return visit, consumer attrition, and consumer subscription, a newly added propensity model of the trained multi-task network 130 that is used to predict consumer unsubscription is able to use the other existing propensity models to minimize additional engineering tasks associated with developing and training the newly added propensity model.

In some embodiments, the consumer reaction model 100 also includes the predictive model 134. The predictive model 134 may include a lookalike model or any other model capable of comparing inputs and identifying groupings of users using the comparison of inputs. By way of example, the output of the trained multi-task network 130 provided to the predictive model 134 includes a dense vector entity representation of a consumer. The predictive model 134 receives the dense vector entity representations of the consumers and organizes the consumers into groups based on the dense vector entity representations. For example, certain customers may include traits that are particularly valuable (e.g., a high likelihood of conversion, a high subscription rate, etc.). The dense vector entity representation of these customers provides the predictive model 134 with a target consumer profile to identify other consumers that potentially share the same particularly valuable traits. When the predictive model 134 has segmented the consumer base into categories based on dense vector similarities, the consumer reaction model 100 provides the results to the consumer interaction tool 128 to further guide digital information presented to the consumers to correspond to goals associated with consumers or groups of consumers identified by the predictive model 134.

Figure 2:
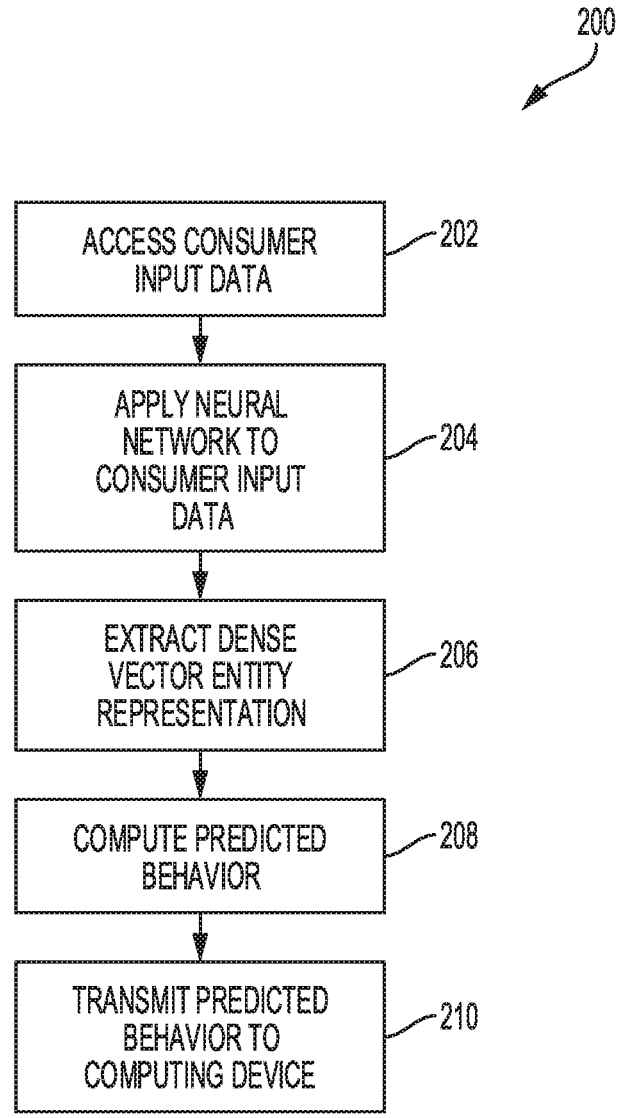
FIG. 2 depicts an example of a process for operating the consumer reaction model of FIG. 1, according to certain embodiments of the present disclosure.

The consumer reaction model 100 can be generated using one or more operations described herein. For instance, FIG. 2 depicts an example of a process 200, which may be performed by a suitable computing system, that operates the consumer reaction model 100 for predicting end user behavior based on historical tracked data 108, according to certain embodiments. In some embodiments, one or more processing devices implement operations depicted in FIG. 2 by executing suitable program code (e.g., the consumer reaction model 100). For illustrative purposes, the process 200 is described with reference to certain examples depicted in the figures. Other implementations, however, are possible.

At block 202, the process 200 involves accessing input data from the consumer devices 102 using the online services 114 and the data tracking system 104, as described above with reference to FIG. 1. The input data from the consumer devices 102 is stored in the data tracking system 104 as the tracked data 108. In an example, the tracked data 108 includes conversational data 110 and interaction data 112. In some embodiments, other suitable data collected from the consumer is also stored as tracked data 108.

A processing device executes the data tracking system 104 (or suitable other program code) to implement block 202. For example, the program code for the data tracking system 104, which is stored in a non-transitory computer-readable medium, is executed by one or more processing devices. Executing the data tracking system 104 causes the processing device to read the tracked data 108 from the consumer devices 102 and write the tracked data 108 to the same non-transitory computer-readable medium or a different non-transitory computer-readable medium that stores the program code for the data tracking system 104. In some embodiments, accessing the tracked data 108 involves communicating, via a data bus, suitable signals between a local non-transitory computer-readable medium and the processing device. In additional or alternative embodiments, accessing the tracked data 108 involves communicating, via a data network, suitable signals between a computing system that includes the non-transitory computer-readable medium and a computing system that includes the processing device.

At block 204, the process 200 involves applying a neural network (e.g., the trained multi-task network 130) to the consumer input data (e.g., the tracked data 108). The trained multi-task network 130 includes simultaneously trained subnets representing propensity models of the trained multi-task network 130. Each propensity model of the multi-task network 130 predicts a different task based on the tracked data 108. In one example, a set of the tracked data 108 includes conversational data 110 and interaction data 112, as described above with respect to FIG. 1. At least some of the interaction data 112 includes data describing (or otherwise indicating) observable features. For instance, the data tracking system 104 may generate data regarding discrete, observable attributes of a particular consumer or other relationship between a pair of entities, such as a sales entity and a consumer or lead. Examples of these attributes include a status of a task related to the consumer, an amount of time since a previous communication with the consumer or lead, and a serial number assigned to a communication with the consumer or lead.

A processing device executes the trained multi-task network 130 (or suitable other program code) to implement block 204. For example, the program code for the training trained multi-task network 130, which is stored in a non-transitory computer-readable medium, is executed by one or more processing devices. Executing the trained multi-task network 130 causes the processing device to access the tracked data 108 from the same non-transitory computer-readable medium or a different non-transitory computer-readable medium. In some embodiments, accessing the trained multi-task network 130 involves communicating, via a data bus, suitable signals between a local non-transitory computer-readable medium and the processing device. In additional or alternative embodiments, accessing the tracked data 108 involves communicating, via a data network, suitable signals between a computing system that includes the non-transitory computer-readable medium and a computing system that includes the processing device.

At block 206, the process 200 involves using the consumer reaction model 100 to extract the dense vector entity representation as an output of the trained multi-task network 130. An input vector made up of the tracked data 108 of a consumer is propagated forward through the trained multi-task network 130 until a dense representation of the tracked data 108 is generated at a shared layer of the consumer reaction model 100. Because the trained multi-task network 130 is made from a set of simultaneously trained propensity models, the output at the shared layer is the dense vector entity representation of the consumer using data relevant to each of the simultaneously trained propensity models.

A processing device executes the trained multi-task network 130 or other program code to implement block 206. For example, the program code for the trained multi-task network 130, which is stored in a non-transitory computer-readable medium, is executed by one or more processing devices. In some embodiments, executing the program code causes a computing system to perform one or more operations that generate the dense vector entity representation of block 206, such as retrieving, from a non-transitory computer-readable medium, relevant input vector data of a consumer during a time period of interest from the data tracking system 104 (e.g., conversational data 110, interaction data 112, etc.).

At block 208, the process 200 involves computing predicted behavior by applying the predictive model 134 to the dense vector entity representation extracted at block 206. In the predictive model 134 (e.g., a lookalike model), the dense vector entity representations extracted at block 206 for a number of users are compared to segment users or groups of users into similar groupings. The dense vector entity representation captures a large set of numerical and categorical customer profile features into a real number vector. A distance between the real number vectors (e.g., the dense vector entity representations) of two customers measured by the predictive model 134 provides a measure of dissimilarity between the customers. Accordingly, consumers/users are able to be grouped into categories of users that are similar to one another. For example, identifying a consumer that is likely to make a purchase and running the dense vector entity representation of that consumer through the predictive model 134 helps identify other consumers that are similarly likely to make such purchases.

A processing device executes the predictive model 134 (or suitable other program code) to implement block 208. For example, the program code for the predictive model 134, which is stored in a non-transitory computer-readable medium, is executed by one or more processing devices. Executing the predictive model 134 causes the processing device to perform a lookalike comparison on the dense vector entity representations received by the predictive model 134. Additionally, the same non-transitory computer-readable medium or a different non-transitory computer-readable medium that stores the program code for the predictive model 134 is used to store the resulting identifications of similar users or groups of users. In some embodiments, identifying similar users or groups of users using the predictive model 134 involves communicating, via a data bus, suitable signals between a local non-transitory computer-readable medium and the processing device. In additional or alternative embodiments, identifying a similar user or groups of users using the predictive model 134 involves communicating, via a data network, suitable signals between a computing system that includes the non-transitory computer-readable medium and a computing system that includes the processing device.

At block 210, the process 200 involves transmitting predicted behavior to a computing device to customize a presentation of electronic content at a remote user device associated with the entity. In some embodiments, customizing the presentation of electronic content to a user is accomplished by providing the output of the consumer reaction model 100 to the consumer interaction tool 128. The consumer interaction tool 128 analyzes the output by the consumer reaction model 100 and customizes an interaction experience of a consumer with the consumer device 102 based on the output. Because the consumer reaction model 100 provides both task predictions of a user and the dense vector entity representation as outputs representing the consumer, the consumer interaction tool 128 can alter the presentation of information presented to the consumer to overcome deficiencies of a particular user. For example, the interaction experience of a user identified as a likely repeat visitor but hesitant purchaser will differ from the interaction experience of another user identified as a likely purchaser and likely subscriber.

In some embodiments, the computing device that receives the predicted behavior and operates the consumer interaction tool 128 is the same computing device that operates the consumer reaction model 100. In other embodiments, the computing device that operates the consumer interaction tool 128 and receives the predicted behavior is separate from the computing device that operates the consumer reaction model 100. For example, the consumer interaction tool 128 may be located within a consumer device 102. In such an embodiment, the consumer interaction tool 128 receives the predicted behavior across the data network 106 from the computing device operating the consumer reaction model 100.

A processing device executes the consumer interaction tool 128 or other program code to implement block 210. For example, the program code for the consumer interaction tool 128, which is stored in a non-transitory computer-readable medium, is executed by one or more processing devices. In some embodiments, executing the program code causes a computing system to perform one or more consumer interaction operations of block 210.

Figure 3:
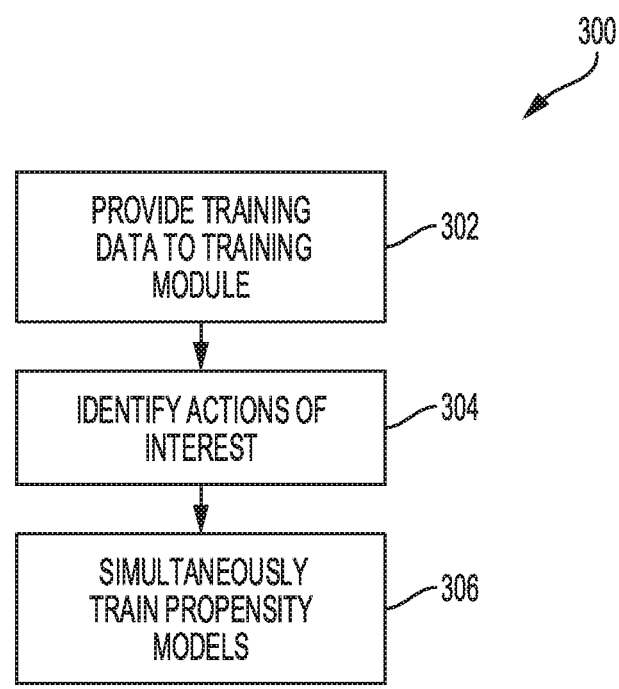
FIG. 3 depicts an example of a process for training the consumer reaction model of FIG. 1, according to certain embodiments of the present disclosure.

Referring to training of the trained multi-task network 130, the training module 116 can train the consumer reaction model 100 using one or more operations described herein. For instance, FIG. 3 depicts an example of a process 300, which may be performed by a suitable computing system, that generates and trains the consumer reaction model 100, according to certain embodiments. In some embodiments, one or more processing devices implement operations depicted in FIG. 3 by executing suitable program code (e.g., the training module 116). For illustrative purposes, the process 300 is described with reference to certain examples depicted in the figures. Other implementations, however, are possible.

At block 302, the process 300 involves providing the training data 118 to the training module 116 using the model development system 120, as described above with reference to FIG. 1. In an example, the training data 118 includes a portion of the tracked data 108 received by the data tracking system 104. In such an example, the tracked data 108 is representative of all visitors who visited a website or accessed a software program that is tracked by the data tracking system 104. The training data 118 may receive a randomly chosen portion of the tracked data 108 (e.g., 20% of the tracked data 108) collected over a time period of interest (e.g., the three weeks of tracked data 108 preceding training of the consumer reaction model 100). In some embodiments, other time ranges of the tracked data 108 and percentages of the tracked data 108 are also used as the training data 118.

Each visitor used in the training data 118 is aggregated into a feature vector. In an example, the feature vectors of the visitors are created based on 41 numerical and 36 categorical variables. In an example using visitor interaction with a website, these variables are based on products a visitor has browsed over the time period of interest, total purchases of various products, number of visits to the website, time spent on the website, type of traffic channel (e.g., search engine traffic, social channel traffic, etc.), number of ad clicks, country, browser, etc. The categorical features, which represent visitor features that are not represented numerically (e.g., country of access, browser type, computing device type, etc.), are coded with numerical representations.

In an example, the numerical representations of the categorical features are coded as one-hot vectors. In such an example, the 36 categorical variables are represented for each visitor as a vector with a length of 1296. That is, each visitor is assigned a 1296 element categorical vector value based on 36 categorical variables where each of the 36 categorical variables are represented with a 36 character one-hot vector representation. Accordingly, in the embodiment also including 41 numerical variables, the length of an input vector for a visitor is 1337 (i.e., the 1296 element categorical vector added to the 41 numerical variables). While the numerical and categorical variables are described specifically herein with 41 variables and 36 variables, respectively, for purposes of illustration, more or fewer variables for either or both of the numerical or categorical variables are also contemplated within the scope of the present disclosure. As discussed in detail below with respect to FIG. 4, additional processing steps may be taken on the training data 118 to provide a more efficient representation of the visitors to the website or software program.

A processing device executes the training module 116 (or suitable other program code) to implement block 302. For example, the program code for the training module 116, which is stored in a non-transitory computer-readable medium, is executed by one or more processing devices. Executing the training module 116 causes the processing device to generate the training data 118 from the tracked data 108 and provide the training data 118 to the training module 116 for use in generating the consumer reaction model 100. Additionally, the same non-transitory computer-readable medium or a different non-transitory computer-readable medium that stores the program code for the training module 116 is used to store the training data 118. In some embodiments, accessing the training data 118 involves communicating, via a data bus, suitable signals between a local non-transitory computer-readable medium and the processing device. In additional or alternative embodiments, accessing the training data 118 involves communicating, via a data network, suitable signals between a computing system that includes the non-transitory computer-readable medium and a computing system that includes the processing device.

At block 304, the process 300 involves identifying actions of interest to the consumer reaction model 100 by the training module 116. In an example, the actions of interest include predicted consumer behaviors including likelihoods of conversions of prospective consumers, defections of existing consumers, receiving positive or negative feedback about electronic content available via an online service (e.g., content describing a brand on a social media website), etc. In some embodiments, these actions of interest are identified based on user input (e.g., where a user instructs the training module 116 to train specific propensity models), and/or the actions of interest are identified automatically by the training module 116 based on the training data 118 used to train the consumer reaction model 100.

A processing device executes the training module 116 (or suitable other program code) to implement block 304. For example, the program code for the training module 116, which is stored in a non-transitory computer-readable medium, is executed by one or more processing devices. Executing the training module 116 causes the processing device to identify actions of interest for use in generating the consumer reaction model 100.

At block 306, the process 300 involves simultaneously training, by the training module 116, propensity models (e.g., the multi-task network 130) of the consumer reaction model 100 that are associated with the identified actions of interest. In an example, a neural network based approach is used to train and build the consumer reaction model 100. The neural network approach provides flexibility in defining an architecture that represents known relationships between identified actions of interest, and the neural network approach provides a vector representation of the customer profile. The vector representation of the customer profile is particularly relevant to the predictive model 134 of FIG. 1, which is discussed in further detail below with respect to FIG. 6.

In the neural network example, there are specific underlying characteristics of consumers that inform their behaviors and are capable of characterization by propensity models associated with the actions of interest. Training the different propensity models simultaneously enables implicit sharing of information across the actions of interest in a manner that benefits each of the different propensity models that make up the consumer reaction model 100.

In some embodiments, the training module 116 specifies the relationships between the actions of interest. This is accomplished through explicit sharing of propensity model weights or through implicit sharing of propensity model weights using regularization that encourages weights to be similar across tasks. With a neural network based consumer reaction model 100, sharing the propensity model weights translates to an architecture where the input data (e.g., the training data 118) passes through a series of common shared layers. Thereafter, a general architecture with action of interest specific layers specializes the shared information for a given action of interest. The resulting consumer reaction model 100 provides one output per action of interest, each output corresponding to a prediction of an individual propensity model. Because the training data 118 includes both consumer inputs and consumer action results, the training of the consumer reaction model 100 involves fitting the consumer reaction model 100 to the training data 100 supplied to the neural network. In this manner, the consumer reaction model 100 outputs a set of prediction values that are used to identify propensities of a consumer.

A processing device executes the training module 116 (or suitable other program code) to implement block 306. For example, the program code for the training module 116, which is stored in a non-transitory computer-readable medium, is executed by one or more processing devices. Executing the training module 116 causes the processing device to generate and train the consumer reaction model 100. Additionally, the same non-transitory computer-readable medium or a different non-transitory computer-readable medium that stores the program code for the training module 116 is used to store the consumer reaction model 100. In some embodiments, accessing the consumer reaction model 100 involves communicating, via a data bus, suitable signals between a local non-transitory computer-readable medium and the processing device. In additional or alternative embodiments, accessing the consumer reaction model 100 involves communicating, via a data network, suitable signals between a computing system that includes the non-transitory computer-readable medium and a computing system that includes the processing device.

Figure 4:
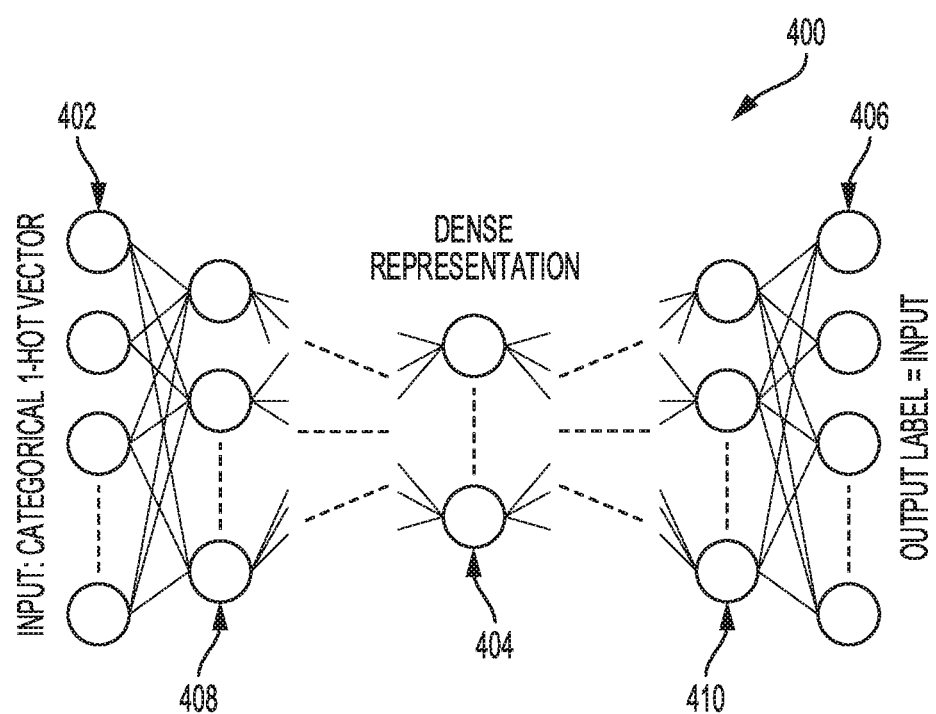
FIG. 4 depicts an example of an autoencoder architecture that is used to encode categorical variable inputs for use in the consumer reaction model of FIG. 1, according to certain embodiments of the present disclosure.

Expanding on block 302 of FIG. 3, FIG. 4 depicts an example of an autoencoder architecture 400 that is used to encode categorical variable inputs 402 into a dense vector entity representation 404 usable as training data 118 and/or inputs into the trained consumer reaction model 100. As discussed above with respect to FIG. 2, the one-hot coding of the categorical variables leads to a sparse vector representation of the categorical variables. That is, due to the one-hot coding, most of the elements in the vector representing the categorical variables have a value of 0. This way of representing data lacks efficiency for use in other applications because all of the potential combinations of the categorical variables are not likely to be present in the tracked data 108. Further, the combinations that are present are likely to follow a highly-skewed distribution with a limited number of combinations of the categorical variables accounting for a bulk of the tracked data 108 and a bulk of the combinations of the categorical variables in the long tail of the distribution. Because of the sparse vector nature of the categorical variable inputs 402, the categorical variables make it harder for a model to converge due to issues like vanishing gradients. To overcome such issues, the autoencoder architecture 400 is used to obtain the dense vector entity representation 404 of the categorical variable vector.

The autoencoder architecture 400 is trained to minimize a difference between the actual input value (e.g., the categorical variable inputs 402) and a predicted input 406, which is provided at an output layer of the autoencoder architecture 400. Once trained, a common layer (e.g., the dense vector entity representation 404) includes all the information in the input, and the dense vector entity representation 404 is used as a dense substitute for the sparse input vector of the categorical variable inputs 402. Additionally, one or more intermediate layers 408 and 410 are used as steps to increase the density of the data or expand the density of the data, respectively. More intermediate layers may also be used as part of the autoencoder architecture 400 depending on a size of the sparse vector input and a size of the dense vector entity representation 404. In some embodiments, the size of dense vector entity representation 404 is set to 30 elements. Different dense vector entity representation sizes are also contemplated within the scope of the present disclosure. By way of example, the size of the dense vector entity representation 404 changes based on the learning process of the autoencoder architecture 400. For example, the dense vector entity representation 400 may be the smallest size that still produces the predicted input 406 within a threshold accuracy range. In some embodiments, the autoencoder architecture 400 is trained to include the dense vector entity representation 404 that will generate the predicted input 406 within a range of 85% to 95% accuracy. In other embodiments, other accuracy threshold ranges are also contemplated.

Figure 5:
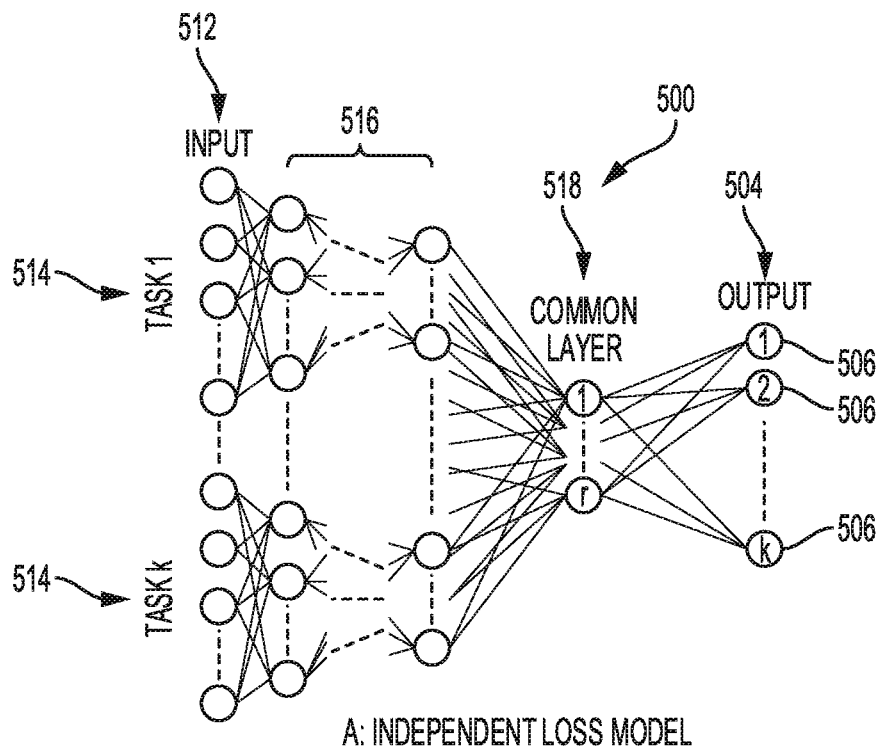
FIG. 5 depicts examples of architectures of the consumer reaction model of FIG. 1, according to certain embodiments of the present disclosure.
Figure 5:
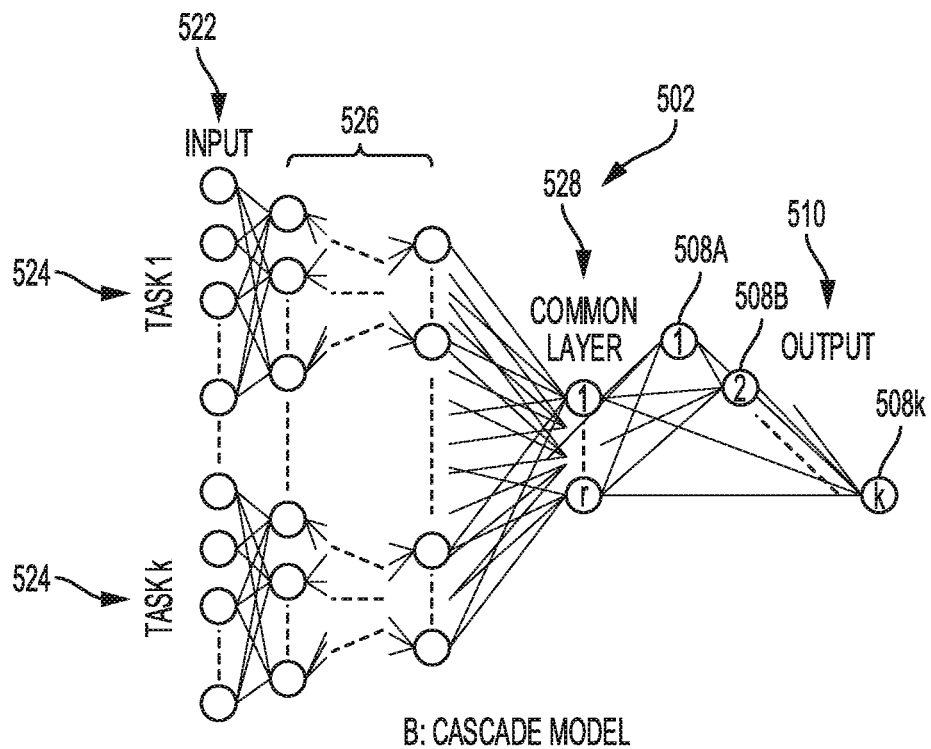

Expanding on block 306 of FIG. 3, FIG. 5 depicts two examples (i.e., an independent loss model 500 and a cascade model 502) of the trained multi-task network 130 of the consumer reaction model 100. The independent loss model 500 is characterized by an output layer 504 where each output node 506 is independent from each other. The cascade model 502 is characterized by at least one of the output nodes relying on at least one of the previously calculated output nodes as an input. That is, the nodes 508a-k of an output layer 510 are not independent from each other.

The independent loss model 500 includes an input layer 512. While training the independent loss model 500, the input layer 512 receives the training data 118 from the training module 116. Because the training data 118 includes known output states (e.g., the likelihood of an action of interest occurring), the training module 116 is able to train individual propensity models 514 (e.g., Task 1-Task k) to generate accurate outputs at the output layer 504. Each of the output nodes 506 are indicative of the result of an associated propensity model 514 of the independent loss model 500. In some embodiments, the training data 118 (or the tracked data 108 when the independent loss model 500 is already trained) progresses through intermediate layers 516 of the independent loss model 500 to produce a denser data representation of a user. The result is a common layer 518 that contains tracked data of a consumer that is common across each of the propensity models 514. The common layer 518 is used as a customer representation and is recorded as a dense vector entity representation. In some embodiments, the training process for building each propensity model 514 (e.g., identifying an optimal set of weights for a neural network) uses the common layer 518 to capture cross-task signals between the propensity models 514. Therefore, without explicitly specifying the nature of the commonalities across the propensity models, a data driven joint representation is obtained as the independent loss model 500.

Similar to the independent loss model 500, the cascade model 502 includes an input layer 522. While training the cascade model 502, the input layer 522 receives the training data 118 from the training module 116. Because the training data 118 includes known output states (e.g., the likelihood of an action of interest occurring), the training module 116 is able to train individual propensity models 524 (e.g., Task 1-Task k) to generate accurate outputs at the output layer 510. Each of the output nodes 508a-508k are indicative of the result of an associated propensity model 524 of the cascade model 502. In some embodiments, the training data 118 (or the tracked data 108 when the cascade model 502 is already trained) progresses through intermediate layers 526 of the cascade model 502 to produce a denser representation of a user. The result is a common layer 528 that contains data of a consumer that is common across each of the propensity models 524. The common layer 528 is used as a customer representation and is recorded as a dense vector entity representation.

In some embodiments, the training process for building each propensity model 524 (e.g., identifying an optimal set of weights for a neural network) uses the common layer 528 to capture cross-task signals between the propensity models 524. Therefore, without explicitly specifying the nature of the commonalities across the propensity models, a data driven joint representation is obtained as the cascade model 502. As mentioned above, the output layer 510 includes output nodes 508a-508k, and at least one of the output nodes 508a-508k relies on at least one other output node 508a-508k as an input. As depicted, each of the nodes 508a-k beyond the node 508a relies on the node 508a-k calculated immediately prior to itself as an input value. Other reliance configurations of the output nodes 508a-508k are also contemplated within the scope of the present disclosure. For example, in some embodiments, only a single output node 508b-508k relies on an output of a node 508a-k calculated prior to the single output node 508b-508k.

Figure 6:
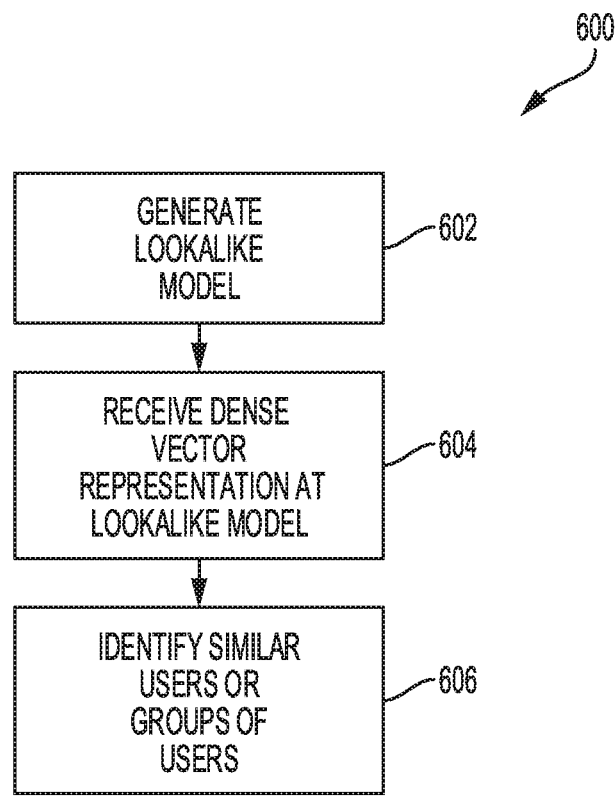
FIG. 6 depicts an example of a process for performing a lookalike model using dense vector entity representations generated by the consumer reaction model of FIG. 1, according to certain embodiments of the present disclosure.

In addition to providing predictions of a consumer relating to the actions of interest, each of the common layers 518 and 528 of the consumer reaction model 100 also provides the dense vector entity representation of the consumer that is usable as a customer profile in the predictive model 134. For instance, FIG. 6 depicts an example of a process 600, which may be performed by a suitable computing system, that performs the predictive model 134 of FIG. 1. In some embodiments, one or more processing devices implement operations depicted in FIG. 6 by executing suitable program code (e.g., the predictive model 134). For illustrative purposes, the process 600 is described with reference to certain examples depicted in the figures. Other implementations, however, are possible.

At block 602, the process 600 involves generating the predictive model 134 (e.g., a lookalike model), as described above with reference to FIG. 1. In an example, the predictive model 134 provides a model that measures distance between the dense vector entity representations of two or more consumers. In this manner, the predictive model 134 measures a dissimilarity between the consumers. For example, a larger numerical distance between the dense vector entity representations indicates a greater amount of dissimilarity between the consumers. Likewise, a smaller numerical distance between the dense vector entity representations indicates a greater amount of similarity between the consumers. Other models that are able to measure similarity or dissimilarity between dense vector entity representations are also contemplated within the scope of the present disclosure.

A processing device executes the model development system 120 (or suitable other program code) to implement block 602. For example, the program code for the model development system 120, which is stored in a non-transitory computer-readable medium, is executed by one or more processing devices. Executing the model development system 120 causes the processing device to generate the predictive model 134 based on parameters of the dense vector entity representations (e.g., based on a number of elements used in the dense vector entity representation). Additionally, the same non-transitory computer-readable medium or a different non-transitory computer-readable medium that stores the program code for the model development system 120 is used to store the predictive model 134. In some embodiments, accessing the predictive model 134 involves communicating, via a data bus, suitable signals between a local non-transitory computer-readable medium and the processing device. In additional or alternative embodiments, accessing the predictive model 134 involves communicating, via a data network, suitable signals between a computing system that includes the non-transitory computer-readable medium and a computing system that includes the processing device.

At block 604, the process 600 involves receiving the dense vector entity representations at the predictive model 134. In some embodiments, the dense vector entity representations include a real number vector of length 30. That is, the dense vector entity representation includes 30 numerical elements to represent each of the entities. Larger or smaller lengths of the dense vector entity representations are also contemplated within the scope of the present disclosure, and the real number vector of length 30 is used for illustrative purposes only. As discussed above with respect to FIG. 5, the dense vector entity representations are byproducts of the consumer reaction model 100. For example, the dense vector entity representation is a vector of numerical values provided in each of the common layers 518 and 528 of the consumer reaction model 100.

A processing device executes the consumer reaction model 100 (or suitable other program code) to implement block 604. For example, the program code for the consumer reaction model 100, which is stored in a non-transitory computer-readable medium, is executed by one or more processing devices. Executing the consumer reaction model 100 causes the processing device to provide the dense vector entity representation to the predictive model 134. Additionally, the same non-transitory computer-readable medium or a different non-transitory computer-readable medium that stores the program code for the consumer reaction model 100 is used to store the dense vector entity representation. In some embodiments, providing the dense vector entity representation to the predictive model 134 involves communicating, via a data bus, suitable signals between a local non-transitory computer-readable medium and the processing device. In additional or alternative embodiments, providing the dense vector entity representation to the predictive model 134 involves communicating, via a data network, suitable signals between a computing system that includes the non-transitory computer-readable medium and a computing system that includes the processing device.

At block 606, the process 600 involves identifying similar users or groups of users of the consumer reaction model 100 using the predictive model 134. In the predictive model 134, the dense vector entity representations received at block 604 are compared to segment users or groups of users into similar groupings. The dense vector entity representation captures a large set of numerical and categorical customer profile features into a real number vector. A distance between the real number vectors (e.g., the dense vector entity representations) of two customers measured by the predictive model 134 provides a measure of dissimilarity between the customers. Accordingly, consumers/users are able to be grouped into categories of users that are similar to one another. For example, identifying a consumer that is likely to make a purchase and running the dense vector entity representation of that consumer through the predictive model 134 helps identify other consumers that are similarly likely to make such purchases.

A processing device executes the predictive model 134 (or suitable other program code) to implement block 606. For example, the program code for the predictive model 134, which is stored in a non-transitory computer-readable medium, is executed by one or more processing devices. Executing the predictive model 134 causes the processing device to perform a lookalike comparison on the dense vector entity representations received by the predictive model 134. Additionally, the same non-transitory computer-readable medium or a different non-transitory computer-readable medium that stores the program code for the predictive model 134 is used to store the resulting identifications of similar users or groups of users. In some embodiments, identifying similar users or groups of users using the predictive model 134 involves communicating, via a data bus, suitable signals between a local non-transitory computer-readable medium and the processing device. In additional or alternative embodiments, identifying a similar user or groups of users using the predictive model 134 involves communicating, via a data network, suitable signals between a computing system that includes the non-transitory computer-readable medium and a computing system that includes the processing device.

Figure 7:
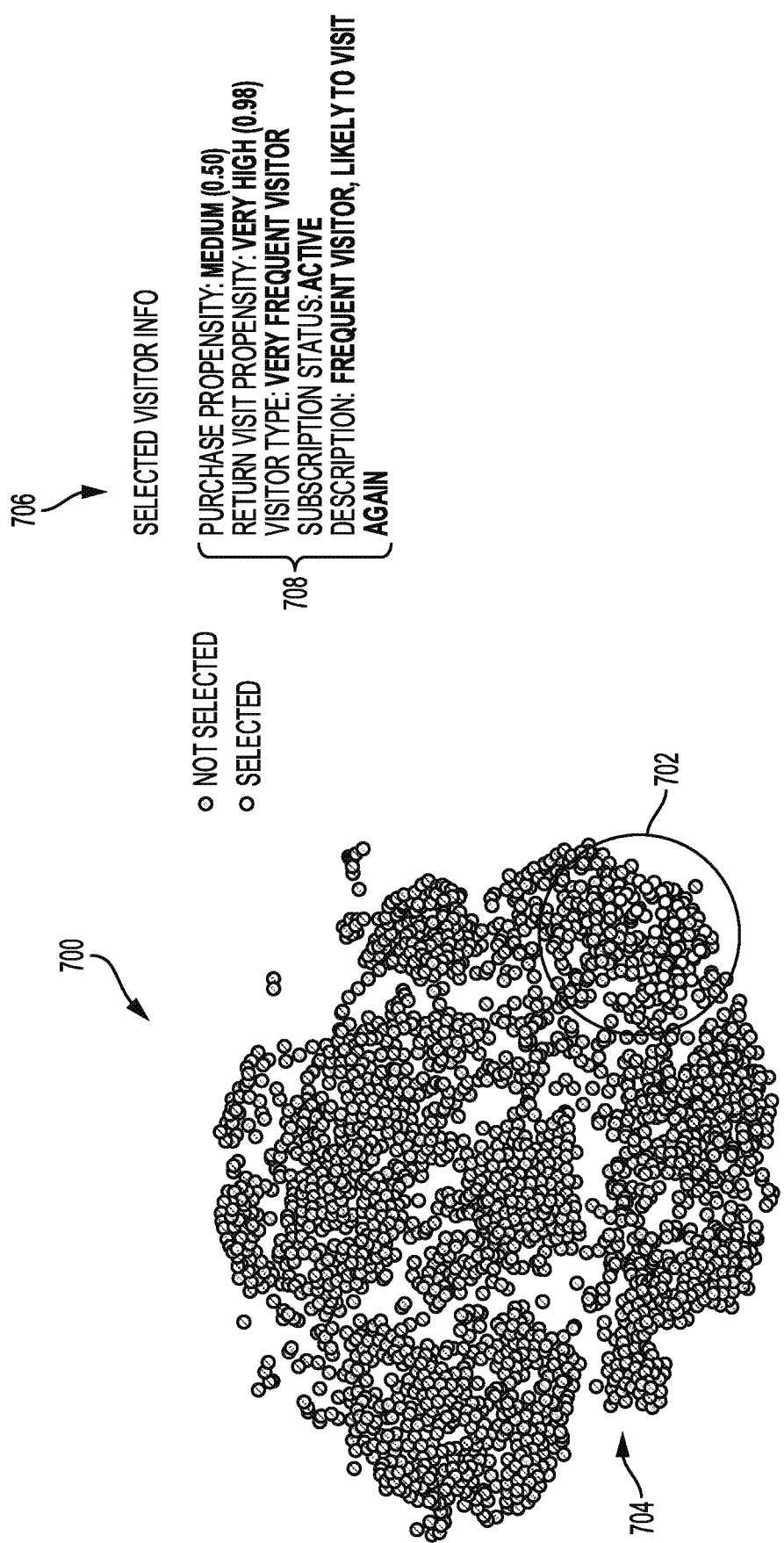
FIG. 7 depicts an example of a representation of a result of the lookalike model of FIG. 6, according to certain embodiments of the present disclosure.

Expanding on the process 600 described above with respect to FIG. 6, FIG. 7 depicts an example of a representation 700 of a result of the predictive model 134 for a selected consumer profile (e.g., a dense vector entity representation of the selected consumer). As illustrated, an area 702 includes the dense vector entity representations that are "nearest neighbors" to the selected consumer profile, as identified by the predictive model 134. An area 704 includes the remainder of the dense vector entity representations that did not fall within the "nearest neighbor" threshold identified by the predictive model 134.

In some embodiments, selected visitor information 706 narrows down portions of the dense vector entity representation of the selected consumer profile to a number of key traits 708. As illustrated, the key traits 708 include purchase propensity, return visit propensity, visitor type, subscription status, and a general description of the selected consumer. In the illustrated embodiment, the predictive model 134 performs the user profile comparison based on only the selected visitor information 706. Accordingly, the area 702 includes a set of users that are the "nearest neighbors" to the selected visitor information 706 and not the entire dense vector entity representation of a selected user. The predictive model 134 is thus able to identify groups of users that include the specified key traits 708 of the identified user.

Figure 8:
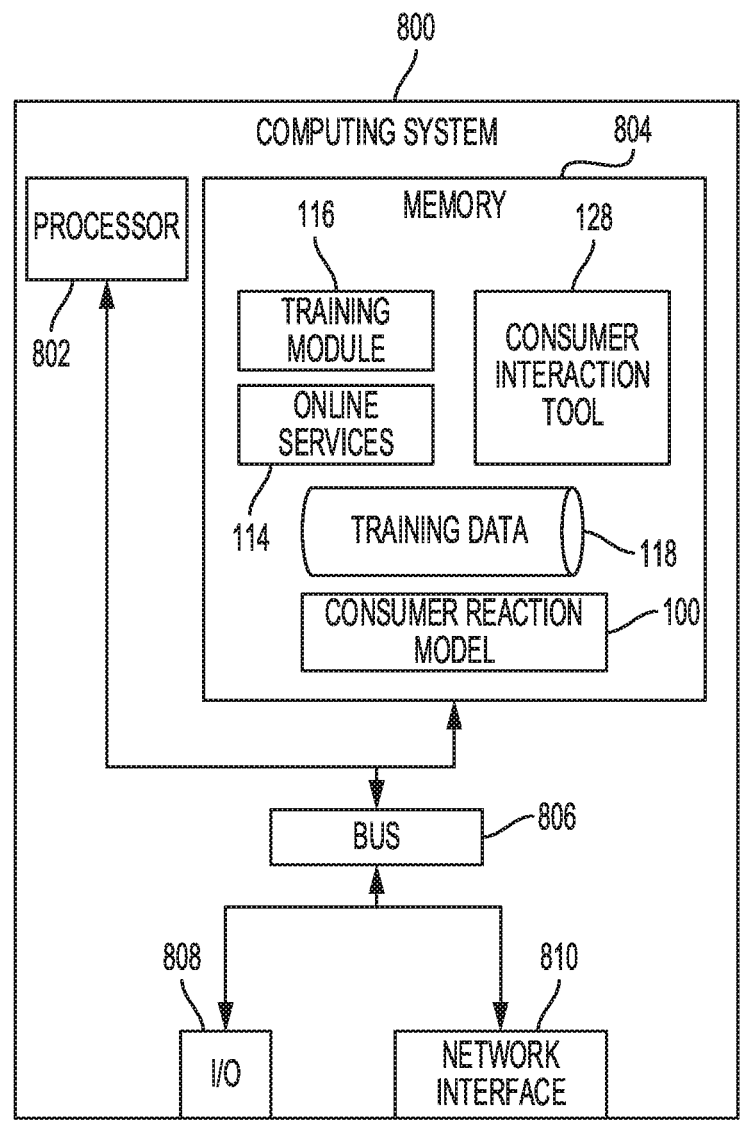
FIG. 8 depicts an example of a computing system that performs certain operations described herein, according to certain embodiments of the present disclosure.

Example of a Computing System for Providing a Consumer Reaction Model with a Multi-Task Network Any suitable computing system or group of computing systems can be used for performing the operations described herein. For example, FIG. 8 depicts examples of computing system 800 that executes a training module 116. In some embodiments, the computing system 800 also executes the consumer interaction tool 128, as depicted in FIG. 8. In other embodiments, a separate computing system having devices similar to those depicted in FIG. 8 (e.g., a processor, a memory, etc.) executes the consumer interaction tool 128.

The depicted examples of a computing system 800 includes a processor 802 communicatively coupled to one or more memory devices 804. The processor 802 executes computer-executable program code stored in a memory device 804, accesses information stored in the memory device 804, or both. Examples of the processor 802 include a microprocessor, an application-specific integrated circuit ("ASIC"), a field-programmable gate array ("FPGA"), or any other suitable processing device. The processor 802 can include any number of processing devices, including a single processing device.

The memory device 804 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 800 may also include a number of external or internal devices, such as input or output devices. For example, the computing system 800 is shown with one or more input/output ("I/O") interfaces 808. An I/O interface 808 can receive input from input devices or provide output to output devices. One or more buses 806 are also included in the computing system 800. The bus 806 communicatively couples one or more components of a respective one of the computing system 800.

The computing system 800 executes program code that configures the processor 802 to perform one or more of the operations described herein. The program code includes, for example, the training module 116, the consumer interaction tool 128, and the online services 114, or other suitable applications that perform one or more operations described herein. The program code may be resident in the memory device 804 or any suitable computer-readable medium and may be executed by the processor 802 or any other suitable processor. In some embodiments, the training module 116, the consumer interaction tool 128, and the online services 114 are stored in the memory device 804, as depicted in FIG. 8. In additional or alternative embodiments, one or more of the training module 116, the consumer interaction tool 128, and the online service 114 are stored in different memory devices of different computing systems. In one example, a model development system implemented by a first computing system having the devices depicted in FIG. 8 can communicate with one or more additional computing systems that use devices depicted in FIG. 8 to implement a consumer interaction tool 128 and an online service 114. In another example, a first computing system that uses the devices depicted in FIG. 8 to implement the consumer interaction tool 128 can communicate with one or more additional computing systems that use devices depicted in FIG. 8 to implement an online service 114, where these communications facilitate the customization of online content presented to consumer devices. In additional or alternative embodiments, the program code described above is stored in one or more other memory devices accessible via a data network.

The computing system 800 can access one or more of the training data 118 and the trained consumer reaction model 100 in any suitable manner. In some embodiments, some or all of one or more of these data sets, models, and functions are stored in the memory device 804, as in the example depicted in FIG. 11. For example, a computing system 800 that executes the training module 116 can provide access to the trained consumer reaction model 100 by external systems that execute the consumer interaction tool 128.

In additional or alternative embodiments, one or more of these data sets, models, and functions are stored in the same memory device (e.g., one of the memory device 804). For example, a common computing system, such as the marketing apparatus 104 depicted in FIG. 1, can host the training module 116 and the consumer interaction tool 128 as well as the trained consumer reaction model 100. In additional or alternative embodiments, one or more of the programs, data sets, models, and functions described herein are stored in one or more other memory devices accessible via a data network.

The computing system 800 also includes a network interface device 810. The network interface device 810 includes any device or group of devices suitable for establishing a wired or wireless data connection to one or more data networks. Non-limiting examples of the network interface device 810 include an Ethernet network adapter, a modem, and the like. The computing system 800 is able to communicate with one or more other computing devices (e.g., a computing device executing a consumer interaction tool 128) via a data network using the network interface device 810.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method comprising:
   accessing, by one or more processing devices of a model development system, from a non-transitory computer-readable medium, input data for an entity;
   transforming, by the one or more processing devices, the input data into a dense vector entity representation representing the entity, wherein transforming the input data comprises:
      applying, to the input data, a neural network comprising simultaneously trained subnets representing propensity models, wherein each propensity model is configured to predict a different task based on the input data, and
      extracting the dense vector entity representation from a common layer of the neural network to which the simultaneously trained subnets are connected; and
   computing, by the one or more processing devices, a predicted behavior by applying a predictive model to the dense vector entity representation; and
   transmitting, by the one or more processing devices, the predicted behavior to a computing device that customizes, in accordance with the predicted behavior, an interaction experience of a user of a remote user device associated with the entity, wherein customizing the interaction experience includes altering a presentation of information in electronic content displayed on the remote user device.

2. The method of claim 1, further comprising, by the one or more processing devices:
generating a lookalike model, wherein the predictive model comprises the lookalike model, wherein computing the predicted behavior comprises identifying a set of entities with similar characteristics to the entity by applying the lookalike model to the dense vector entity representation of the entity.

3. The method of claim 2, wherein the lookalike model compares the dense vector entity representation with other dense vector entity representations of other entities to identify the set of entities with the similar characteristics to the entity.

4. The method of claim 1, further comprising, by the one or more processing devices:
generating a plurality of output predictions of a plurality of tasks, each task of the plurality of tasks associated with one of a plurality of propensity models, wherein the plurality of output predictions are usable to customize the presentation of the electronic content at the remote user device associated with the entity.

5. The method of claim 4, wherein the plurality of output predictions comprises a first output prediction and a second output prediction, and wherein the second output prediction relies at least in part on the first output prediction.

6. The method of claim 1, further comprising:
generating, by the one or more processing devices, the neural network, wherein generating the neural network comprises:
selecting portions of the input data of a plurality of entities to generate training data;
identifying a plurality of propensity models of the neural network; and
simultaneously fitting the plurality of propensity models to the training data.

7. The method of claim 1, further comprising, by the one or more processing devices:
customizing the presentation of electronic content at the remote user device associated with the entity based on the dense vector entity representation generated by the neural network.

8. The method of claim 1, further comprising:
identifying, by the one or more processing devices, categorical variables of the input data;
autoencoding, by the one or more processing devices, the categorical variables to generate a numerical representation of the categorical variables; and
providing, by the one or more processing devices, the numerical representation of the categorical variables to the neural network.

9. A computing system comprising:
means for accessing, from a non-transitory computer-readable medium, input data for an entity;
means for transforming the input data into a dense vector entity representation representing the entity, wherein the means for transforming the input data comprises:
means for applying, to the input data, a neural network comprising simultaneously trained subnets representing propensity models, wherein each propensity model is configured to predict a different task based on the input data, and
means for extracting the dense vector entity representation from a common layer of the neural network to which the simultaneously trained subnets are connected; and
means for computing a predicted behavior by applying a predictive model to the dense vector entity representation; and
means for transmitting the predicted behavior to a computing device that customizes, in accordance with the predicted behavior, an interaction experience of a user of a remote user device associated with the entity, wherein customizing the interaction experience includes altering a presentation of information in electronic content displayed on the remote user device.

10. The computing system of claim 9, further comprising:
means for generating a lookalike model, wherein the predictive model comprises the lookalike model, wherein computing the predicted behavior comprises identifying a set of entities with similar characteristics to the entity by applying the lookalike model to the dense vector entity representation of the entity.

11. The computing system of claim 10, wherein the lookalike model compares the dense vector entity representation with other dense vector entity representations of other entities to identify the set of entities with the similar characteristics to the entity.

12. The computing system of claim 9, further comprising:
means for generating a plurality of output predictions of a plurality of tasks, each task of the plurality of tasks associated with one of a plurality of propensity models, wherein the plurality of output predictions are usable to customize the presentation of the electronic content at the remote user device associated with the entity.

13. The computing system of claim 12, wherein the plurality of output predictions comprises a first output prediction and a second output prediction, and wherein the second output prediction relies at least in part on the first output prediction.

14. The computing system of claim 9, further comprising:
means for customizing the presentation of electronic content at the remote user device associated with the entity based on the dense vector entity representation generated by the neural network.

15. The computing system of claim 9, further comprising:
means for identifying categorical variables of the input data;
means for autoencoding the categorical variables to generate a numerical representation of the categorical variables; and
means for providing the numerical representation of the categorical variables to the neural network.

16. A non-transitory computer-readable medium having instructions stored thereon, the instructions executable by a processing device to perform operations comprising:
accessing, from a non-transitory computer-readable medium, input data for an entity;
transforming the input data into a dense vector entity representation representing the entity, wherein transforming the input data comprises:
applying, to the input data, a neural network comprising simultaneously trained subnets representing propensity models, wherein each propensity model is configured to predict a different task based on the input data, and
extracting the dense vector entity representation from a common layer of the neural network to which the simultaneously trained subnets are connected; and computing a predicted behavior by applying a predictive model to the dense vector entity representation; and transmitting the predicted behavior to a computing device that customizes, in accordance with the predicted behavior, an interaction experience of a user of a remote user device associated with the entity, wherein customizing the interaction experience includes altering a presentation of information in electronic content displayed on the remote user device.

17. The non-transitory computer-readable medium of claim 16, the instructions executable to perform operations further comprising:

generating a lookalike model, wherein the predictive model comprises the lookalike model, wherein computing the predicted behavior comprises identifying a set of entities with similar characteristics to the entity by applying the lookalike model to the dense vector entity representation of the entity.

18. The non-transitory computer-readable medium of claim 17, wherein the lookalike model compares the dense vector entity representation with other dense vector entity representations of other entities to identify the set of entities with the similar characteristics to the entity.

19. The non-transitory computer-readable medium of claim 16, the instructions executable to perform operations further comprising:

generating the neural network, wherein generating the neural network comprises:

selecting portions of the input data of a plurality of entities to generate training data;

identifying a plurality of propensity models of the neural network; and simultaneously fitting the plurality of propensity models to the training data.

20. The non-transitory computer-readable medium of claim 16, the instructions executable to perform operations further comprising:

identifying categorical variables of the input data;

autoencoding the categorical variables to generate a numerical representation of the categorical variables; and providing the numerical representation of the categorical variables to the neural network.

\* \* \* \* \*